United States Patent [19]

Brander

[11] 4,371,800

[45] Feb. 1, 1983

[54] VIBRATING LINEAR MOTOR FOR ELECTROMAGNETIC FEEDERS AND SIMILAR MACHINES

[75] Inventor: James E. Brander, Strathfield, Australia

[73] Assignee: International Combustion Australia Limited, Australia

[21] Appl. No.: 274,509

[22] Filed: Jun. 17, 1981

Related U.S. Application Data

[63] Continuation of Ser. No. 950,988, Oct. 13, 1978, abandoned, which is a continuation-in-part of Ser. No. 736,319, Oct. 28, 1976.

[30] Foreign Application Priority Data

Mar. 11, 1975 [AU] Australia .............................. PC3816

[51] Int. Cl.³ .............................................. H02K 33/00
[52] U.S. Cl. ................................................... 310/15
[58] Field of Search ..................... 310/15, 28, 27, 30; 318/119–134

[56] References Cited

U.S. PATENT DOCUMENTS

| | | | |
|---|---|---|---|
| 2,259,565 | 10/1941 | Hutcheson | 310/27 X |
| 2,444,134 | 6/1948 | Hittson | 310/30 |
| 3,336,488 | 8/1967 | Scott | 310/30 X |
| 3,366,809 | 1/1968 | Scott | 310/15 |
| 3,433,983 | 3/1969 | Keistman et al. | 310/15 |
| 3,518,463 | 6/1970 | Abbott | 310/15 |
| 3,605,080 | 9/1971 | Abbott | 310/30 X |
| 3,860,839 | 1/1975 | Buchberger et al. | 310/30 X |

Primary Examiner—Donovan F. Duggan
Attorney, Agent, or Firm—D. Paul Weaver

[57] ABSTRACT

An electromagnetic vibratory motor having an armature and a stator, both incorporating a number of magnetic poles spaced apart along the direction of action of the motor. An air gap is maintained between the poles of the armature on the one hand and the poles of the stator on the other so that there is no interference between the respective pole sets during vibration of the motor. In the rest position, the stator poles are arranged symmetrically with respect to the center lines of the gaps between respective armature poles.

6 Claims, 21 Drawing Figures

VIBRATING LINEAR MOTOR FOR ELECTROMAGNETIC FEEDERS AND SIMILAR MACHINES

This is a continuation of application Ser. No. 950,988, filed Oct. 13, 1978, now abandoned which is a continuation-in-part of U.S. Patent Application Ser. No. 736,319 filed Oct. 28, 1976.

This invention relates to electromagnetic vibratory motors for providing the motive force for vibratory feeders, conveyors, separators, screens and other vibratory equipment used in materials handling and related fields.

Vibratory motors of both the electromechanical and electromagnetic type are used to provide the motive force for vibratory equipment used in materials handling and related fields. Each has its own advantages and disadvantages. The present invention is concerned only with vibratory motors of the electromagnetic type. These have in the past been driven by an electromagnet with an air gap. Part of the electromagnet is usually in the shape of an 'E' and is fitted with electrical coil or coils, and the other part of the magnetic circuit is in the shape of an 'I' fitted to the other part of the machine with an air gap between them, so that the two may vibrate relative to one another with a consequent oscillatory increase and decrease in the size of the air gap.

Examples of vibratory conveyors and feeders using electromagnetiic vibratory motors are shown in Australian Patent Specifications Nos. 140,193; 204,274 and 245,317; and in U.S. Pat. Nos. 2,163,249; 2,654,466 and 2,694,156.

Many variations to the basic arrangement described above using magnetic circuits made up of E and I parts are known, some employing permanent magnets to permit operation with full wave alternating current while others operate from half wave alternating current by use of rectifiers. Almost all of these machines run at the frequency of the electricity supply, in general either at 50 or 60 Hz. The machines may be made to operate at a lower frequency, again usually some sub-multiple of the supply frequency, such as 25 or 30 Hz, but the machines are not suited to provide a large vibrational amplitude and thus are quite inefficient at a lower frequency than the full mains frequency. The air gap is in the direction of motion of the moving parts and is subject to drift in size. Striking of the two parts of the magnetic circuit may occur due to expansion or contraction caused by temperature variation or by fluctuations in supply voltage and frequency, or changes in the natural frequency of vibration of the resonant system. If striking does occur, the machine may be very rapidly damaged and this is the most important disadvantage of the electromagnetic vibratory feeder, either preventing its use in many applications or requiring extremely complicated control equipment to prevent this striking taking place.

Linear motors have been known for some years and their application to passenger trains and other similar vehicles is well known. Several attempts have been made in the past to adapt a linear motor to provide the motive force for vibratory feeders and similar machines, but each attempt has failed due to a design fault in the suggested method. Most linear motors constructed have been of the travelling flux wave type where electrical coils are energized in sequence to provide a tractive force moving along the motor. This type of motor is directly applicable to vehicle transportation on rails where the vehicle length is only a very small part of the track length, but a similar principle used in machines for materials handling means that a large proportion of the materials making up the motor are not in use at any one time and the design is therefore inefficient.

Another type of linear motor which has been adapted to vibratory equipment is that which takes the form of a double solenoid. An electrical coil, when energized, draws a piece of ferrous material, usually soft iron, into a magnetic path. When the coil is de-energized, the armature is forced out of the magnetic path. The motor is usually double ended in that while one end of the armature is being drawn into a magnetic path by one coil being energized, the other end of the armature is forced out of a similar magnetic path as its coil is deenergized.

Figure 1:
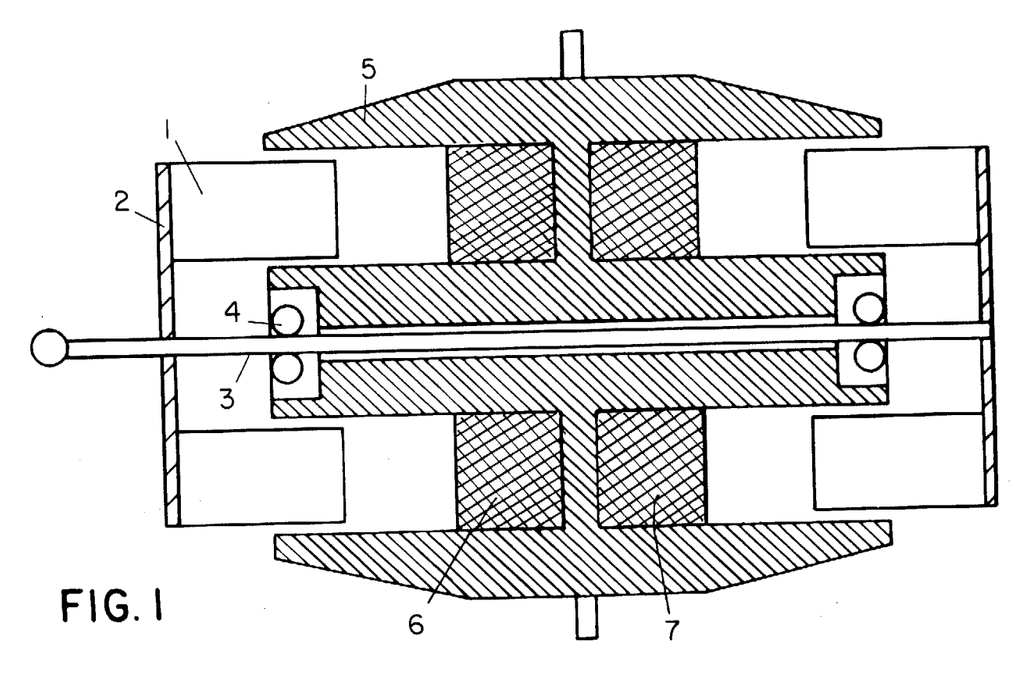

FIG. 1 illustrates this type of motor where the soft iron armature 1 is attached to a frame 2 and a guiding bar 3 moving through bearings 4. A magnetic path is formed by the structure 5. For the particular motor shown, A.C. current of a particular frequency passes through coils 6 and 7.

This type of motor will provide an oscillatory action particularly when used on machines which utilize resonance. The design is not efficient as much of the iron making up the magnetic circuit is not fully utilized. Of more importance, however, when used with machines that do employ resonance, the motor is not inherently self limiting in stroke. The force of traction on the soft iron armature poles 1 decreases as these poles enter the magnetic path formed by the structure 5, but the tractive force does not drop to zero. Even with the pole pieces 1 touching the electrical coil 6 there would still be a tractive force drawing the armature frame 2 to the right in the figure when the coil 6 was energized, so that damage could occur.

An example of a further type of linear motor which has been adapted to vibratory machines is that shown in U.S. Pat. No. 2,444,134 by Hittson. The design shown in this patent again suffers from the disadvantage that the arrangement is not inherently self limiting. Movement of the elongated armature 25 shown in FIG. 3 of that patent where poles 26 on the armature are attracted to poles 20, initially slightly offset from poles 26, on a field structure 16 is limited in one direction as should the poles 26 begin to pass the pole 20, attraction in one direction will cease and attraction in the other direction will begin, halting the motion of the armature. However, no such arrangements exist in the other direction as movement in the other direction is not under control of the magnetic circuit, the electrical coils (22) being not energized. The basic design fault of the motor shown in that patent is that for operation very close to or at resonance, the maximum movement of the armature is not limited by the motor.

U.S. Pat. No. 1,490,155 on "Electromagnetic Power Device" issued to Zbinden is another example of a linear motor which has an inherent, although in this case weak, halting motion of the armature. For instance, note that in Zbinden the breadth of the pole rings is approximately equal to the breadth of the gap between the pole pieces so that the tractive force of the motor will not exhibit a sinusoidal function because the magnetic path as seen by the motor elements does not have a constant reluctance throughout the path of motion. This is further accentuated by the filling of non-magnetic material placed between the pole pieces in Zbinden to create an insulating bridge annuli between stator fields. The halting on limiting motion of the motor is weak due to the large gap between the pole pieces. Also a basic design fault of the motor shown in Zbinden is that the efficiency of the motor is reduced because of the varying reluctance. A motor with constant reluctance through its motion will appear to be almost entirely resistive and be able to transfer power very efficiently from the electrical power supply to the driven load, whereas a motor with varying reluctance will appear inductive and be inefficient in power transfer.

The prior art exemplified by U.S. Pat. No. 1,490,155 and issued to Zbinden and Trench, U.S. Pat. No. 3,149,255 respectively incorporate armatures which are solids of rotation with their longitudinal axis coincident with the longitudinal axis of the stators. This cylindrical form is inefficient when large pole areas are used because the volume within the circle is wasted. The tractive force in these motors is small so it is essential to have large pole areas. In the present invention the poles form planes and thus large pole areas can be realized without lost volume.

Departing from the cylindrical form prevents the use of simple circular bushings as guides for the moving armature and for withstanding the large tractive forces between armature and stator. This penalty does not exist in the present invention because the inventive concept includes the elimination of bearings and bushings as can be seen in the illustrations described further on in this specification.

In the construction of vibratory machines employing a resonant phenomenon for handling materials, the cost of the springs or other energy storage devices that provide the resonant action is a significant part of the cost of the machine. Machines employing linear motors are normally operated very close to or at resonance and if operated at resonance there must be some limit on the motion that can occur. With efficient use of materials the limit on this motion should lie only just above the maximum vibratory movement to be usefully obtained from the machine. This means a linear motor should have an inherently self limiting action very close to the maximum amplitude to be used. The self limiting action should also act as a rigid boundary on the possible amplitude of vibration as a self limiting action which permits, say, half as much amplitude again as the maximum useful amplitude means that the cost of the energy storage devices such as springs will also be at least half as much again as the cost need be.

Figure 2:
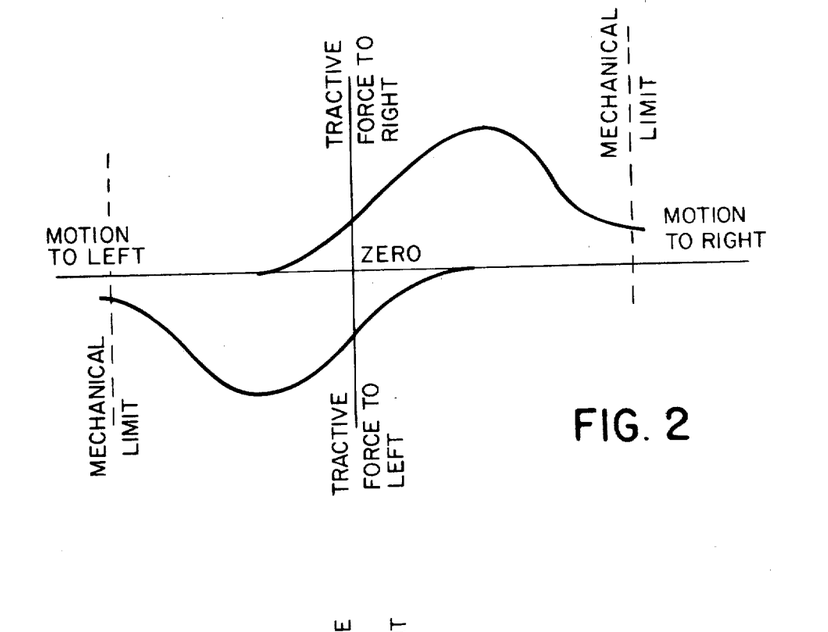

FIG. 2 shows the relationship between tractive forces and displacement from rest position for the type of linear motion shown in FIG. 1. The upper curve in the figure shows the tractive force generated when the armature 1 in FIG. 1 is to be driven to the right and the lower curve applies when the armature is being driven to the left. It can be seen that for motion away from the rest position the tractive force increases in value to a maximum and then falls but does not reverse direction before a mechanical limit to motion is encountered.

Figure 3:
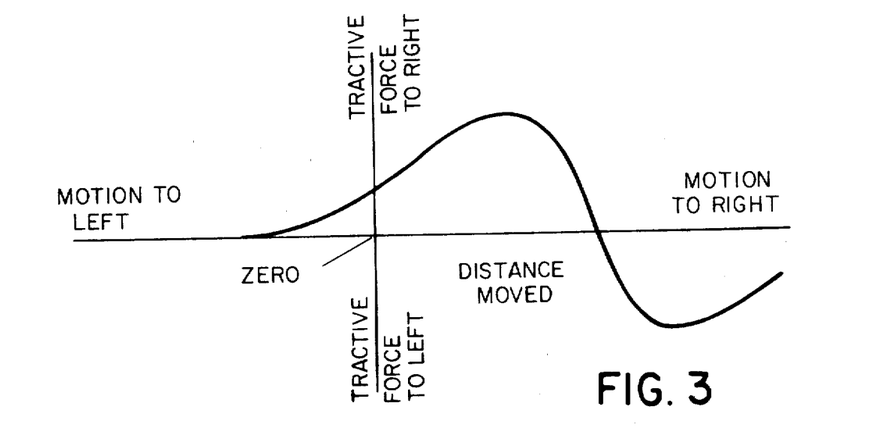

FIG. 3 shows the relationship between the tractive force and displacement from rest position for the vibratory conveyor motor shown in U.S. Pat. No. 2,444,134. It can be seen that for motion in one direction from the rest position the tractive force increases to a maximum, falls and then reverses direction. This force reversal will effectively limit motion in one direction, but no such provision is made for motion in the other direction from the rest position as the coils, Item 22 in FIG. 2 of subject patent, are not energized for motion in the other direction.

While there are many ways to limit the motion of the armature by electrical means, such as reducing the current flow through the electrical coils, it is much more preferable that the motor be inherently self limiting to prevent damage to the springs or other parts of the machine as when the machine is operating at resonance without being required to convey bulk materials, only very small forces are required to generate extremely large amplitudes of oscillation.

The present invention provides a means for permitting large amplitudes to be obtained from electromagnetic vibratory motors and eliminates the air gap in the direction of motion of the vibrating parts, thus eliminating the need for constant adjustment of the air gap, and care in ensuring that striking does not take place. A further object of the invention is to provide an inherently self limiting operation of the vibratory motor so that the vibratory machine is not damaged when operated at or near resonance and at the maximum amplitude which the motor is capable of generating when unloaded.

According to this invention an electromagnetic vibratory motor comprises an armature having a plurality of magnetic poles spaced apart along the direction of action of the motor, the spacing between said poles forming an air gap having a distance between individual pole pieces less than the width along the direction of motion of the motor of the individual pole pieces, said poles having pole faces generally parallel to said direction of action; spring means attached to said armature; a stator having a plurality of magnetic poles spaced apart along the direction of action of the motor, the pole pitch of the stator being the same as that of the armature, the poles of the armature and stator being closely adjacent and one set of poles being either of fixed magnetic polarity or of predetermined alternating character, and the stator poles being arranged symmetrically about the centres of respective armature poles in the rest position; first electrical windings about the poles of the other set of poles; and means for feeding alternating current through said windings.

References will now be made to the further accompanying drawings in which.

Figure 4:
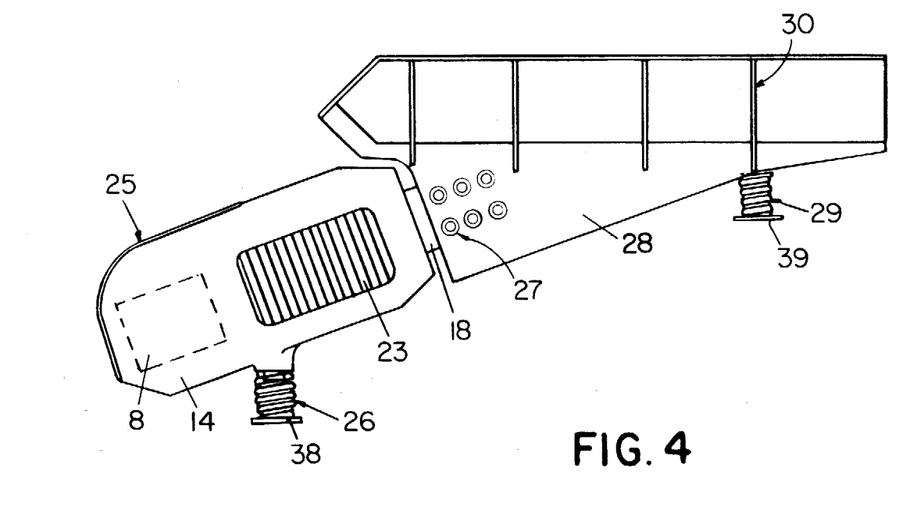
FIG. 4 shows a vibratory conveyor employing an electromagnetic vibratory motor according to this invention.

Referring now to FIG. 4, a conveyor trough 28 to be vibrated is bolted to an armature bracket 18 by means of bolts 27. The armature bracket 18 in turn is connected to spring means 23 which couples the armature and trough to the stator 8 of the motor and a base or reaction mass 14 enclosing the motor. The use of leaf springs 23 as shown in a known means for providing resonant tuning between the two masses to be vibrated. The leaf springs could be replaced by coil springs or other resilient means, as is well known. A cover 25 protects the driving means from the entry of dust or water. The whole machine is resiliently supported on springs 26, 29 to permit free vibration. The ends of these springs are attached to a rigid supporting structure by spring seat plates 38 and 39. Ribs 30 on the trough provide structural stiffness.

Figure 5:
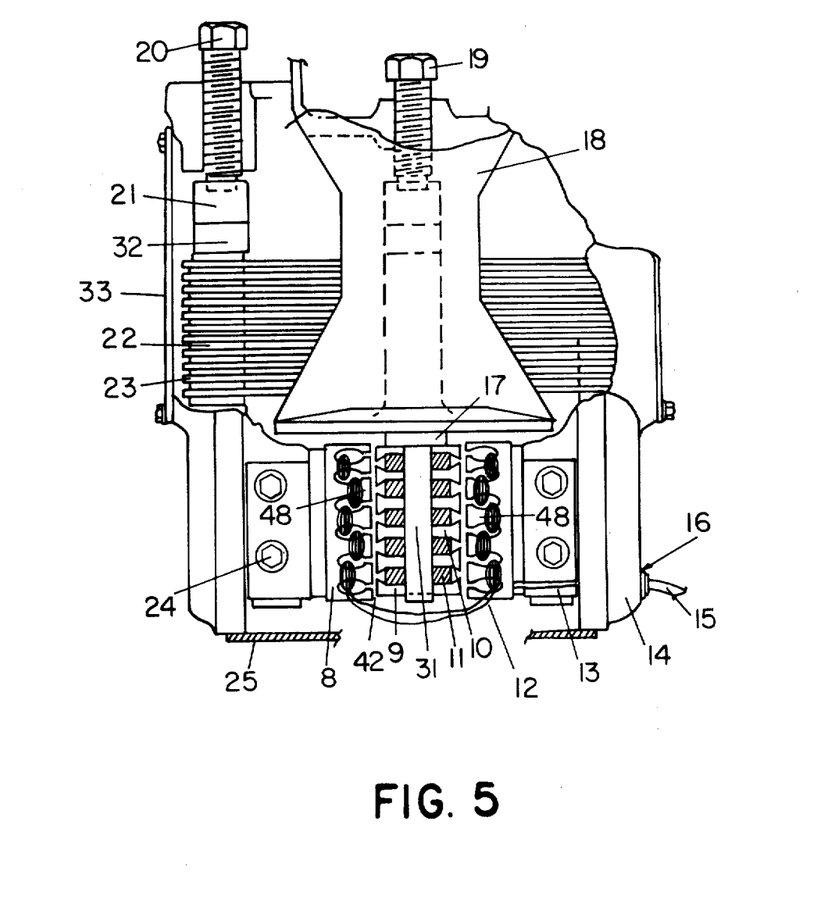
FIG. 5 shows, partly in section, the stator, armature, spring assembly of the electromagnetic motor used in the conveyor of FIG. 4.

The vibratory motor is shown in more detail in FIG. 5. The armature bracket 18 is connected to an armature having a group of magnetic poles 9 and 10. These magnetic poles are of constant polarity, the magnetizing force being generated by permanent magnets 11. A clamp 31 joins the poles to the armature bracket through a spacer 17.

The stator 8 includes a plurality of magnetically variable poles disposed on either side of the group of magnetically constant poles, 9 and 10, and is fastened to the base mass 14 by suitable brackets 13. A small constant air gap 42 is provided between the poles 9 and 10 and the fixed poles on stator 8. This air gap is adjustable by suitable clamping of the fixing bolts 24. The leaf springs 23 with spacers 22 of some suitable material comprise the resonant spring system, and clamping screws 19, 20 and clamping blocks 21, 32 prevent relative axial movement between springs and spacers. The side covers 33 and rear cover 25 protect the driving means from the entry of dust or water. Electrical windings 12 are wound on the fixed poles on stator 8 in such a way tht adjacent poles have opposite polarities. An electric cable 15 provides connection of the windings to a suitable source of alternating current, now shown, and is supported by a gland 16.

Figure 6:
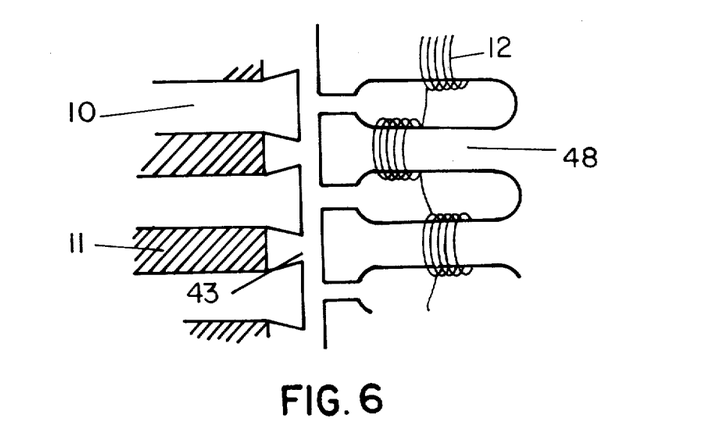
FIG. 6 is a detail showing the pole arrangement used for staggered poles.

The vibratory motor of this embodiment has a pole arrangement as detailed in FIG. 6 in which the poles in the rest position are arranged in a staggered fashion such that the pole gaps 43 on the armature are approximately opposite the centres of the poles on the stator. The stator carries an electrical energizing winding 12 wound on the stator poles 48 and the armature poles 10 are energized by permanent magnets 11.

The pole gaps 43 form air gaps along the face of the poles 11 which are approximately equal to the air gaps between the stator poles 48. These air gaps are small relative to the width of the stator and armature poles so the magnetic path approaches a constant reluctance throughout the motion of the motor. This constant reluctance tends to maximize the efficiency of the motor and result in a more powerful linear motor for a given dimension and current input. In a preferred embodiment such as illustrated in FIG. 6, the air gaps 43 are less than half the width of the pole pieces 10 and 18 as taken along the direction of motion of the motor. This provides for considerable overlapping the poles from one set to the other so that the desired constant reluctance may be approached. No filler material is utilized between pole pieces primarily because it may have a tendency to create an insulating effect with respect to the magnetic path and thus prevent approaching a constant reluctance in the system.

Figure 7:
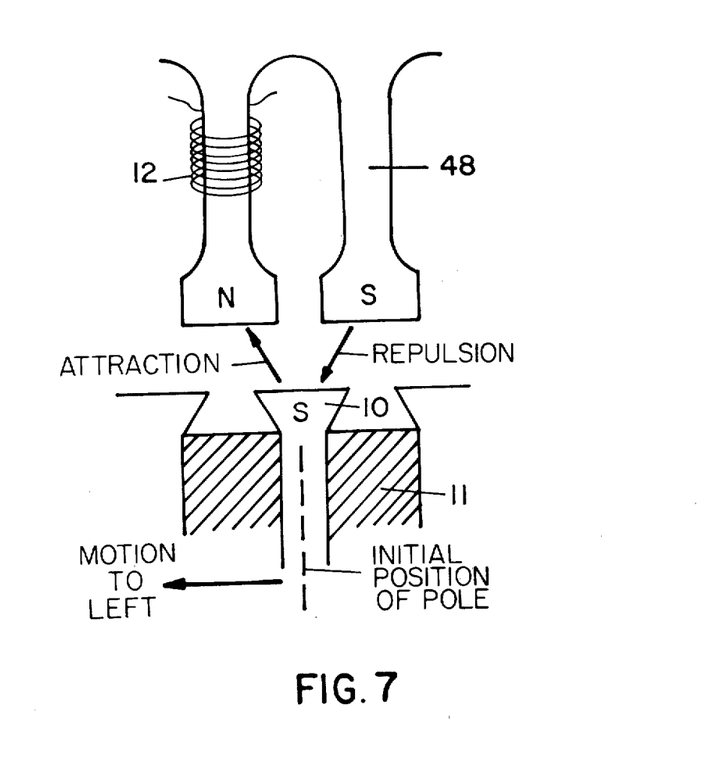
FIG. 7 shows the forces acting on a single pole in the initial position.

FIG. 7 shows the forces of attraction and repulsion action on an armature pole for a particular polarity of stator poles resulting from energization of the electrical windings 12. The armature pole shown is of South polarity and moves to the left, being attracted to the North pole of the stator and repelled by the South pole of the stator.

Figure 8:
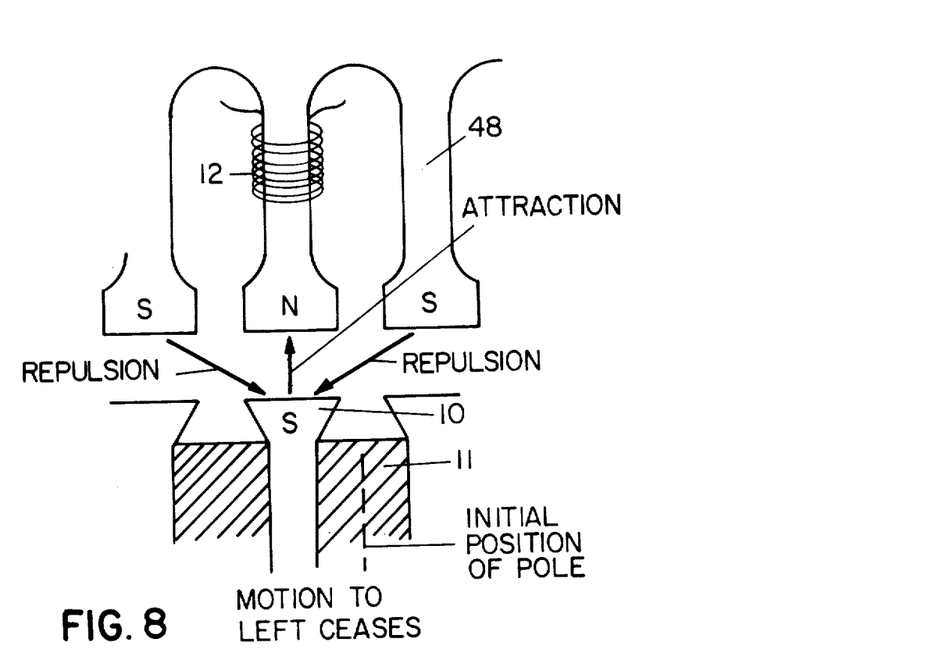
FIG. 8 shows cessation of motion of pole.

FIG. 8 shows the armature pole 10 having moved fully to the left and being directly under the North pole of the stator. The armature pole is now repelled equally by South poles on either side of the North pole but movement further to the left would be also impeded by the attraction force between the armature pole and the North pole on the stator.

Figure 9:
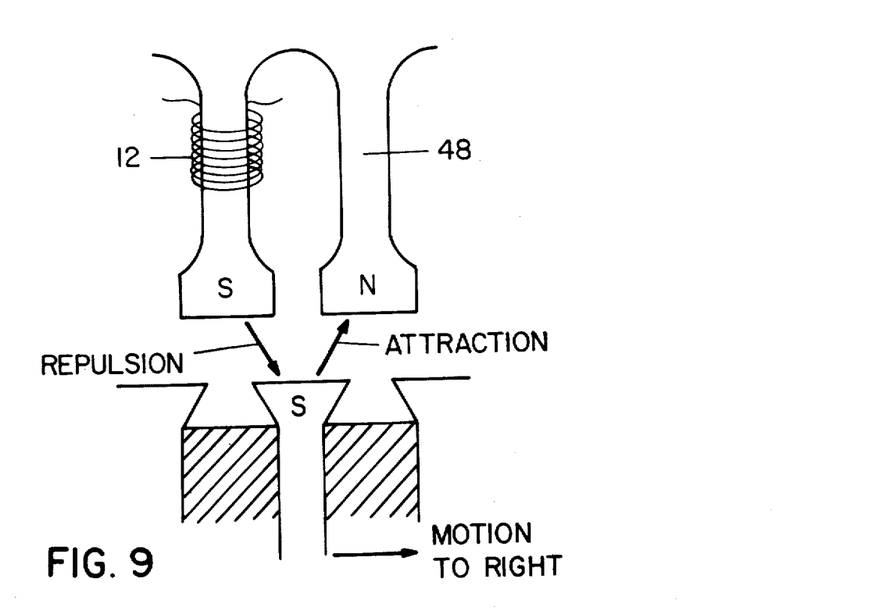
FIG. 9 shows motion of pole in other direction.

FIG. 9 shows the reversal of polarity of the stator effected by change in direction of the current flow through electrical windings 13. The armature pole will now move to the right.

Figure 10:
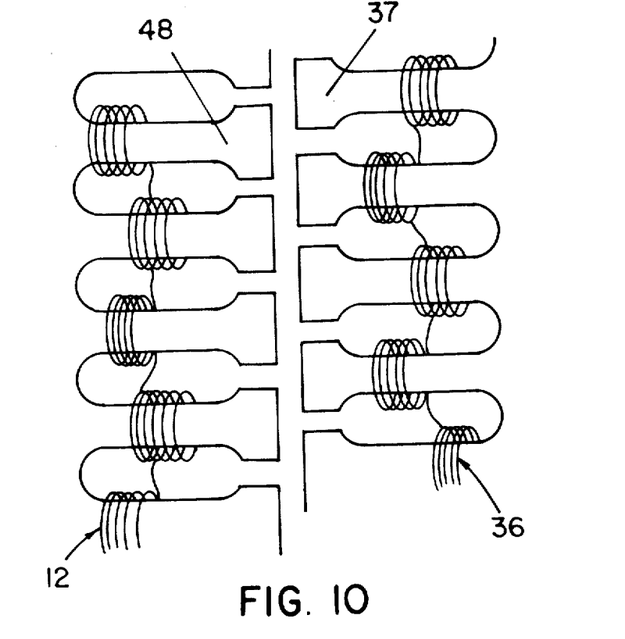
FIG. 10 is similar to FIG. 6 but shows diagrammatically use of windings on both stator and armature for the pole arrangement.

The use of permanent magnets is not essential to provide magnet poles of constant polarity and FIG. 10 illustrates a case where electrical windings are present on both the stator and armature poles. In this figure, Item 37 is an assembly of moving poles with an electric coil 36 providing magnetic energization. The stator poles 48 have an electrical winding 12 providing varying polarity. A D.C. current flowing in winding 36 will cause the pole 37 to maintain a constant polarity. D.C. current is not necessary, however, as current in winding 36 varying at a frequency twice that of the frequency of alternation of current flowing in winding 12 and having a suitable phase relationship between the two alternating currents, will give a similar effect.

Figure 11:
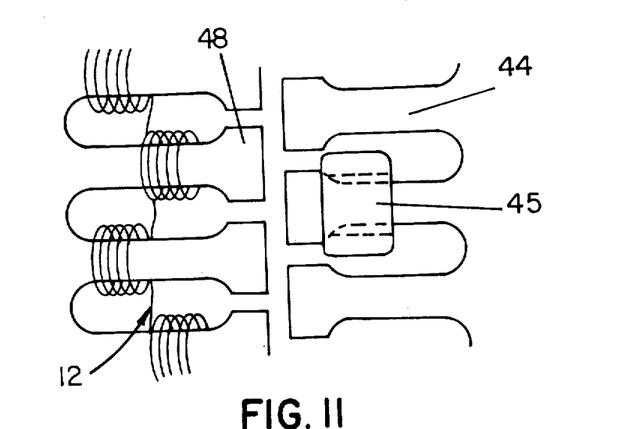
FIG. 11 shows diagrammatically an embodiment in which the armature windings take a form analogous to those of the rotor winding of a conventional squirrel cage induction motor.

Alternatively, the windings can take a form similar to that of the rotor winding of a conventional squirrel cage induction motor in that no external connections are necessary, induction providing the necessary flow for magnetization of the armature poles. This is shown in FIG. 11, where 44 is the armature pole and the electrical windings are shown as Item 45. Each electrical winding is a short circuit around one pole and the current flow in the short circuit winding caused by polarity reversal from electrically driven poles 48, provides the driving force.

The operation of the motor in this manner is analogous to but different from the operation of a squirrel cage induction motor. For the rotary motor a slip frequency is set up in the squirrel cage due to the difference in rotational frequency of the travelling magnetic wave and the rotor, and current is induced in the rotor by transformer action at the slip frequency. Here, no such phenomenon exists as motion is constantly at one frequency and it is the reduced amplitude of vibration of the armature compared to the motion of the reciprocating flux wave that causes current to flow in the armature winding 45.

Figure 12:
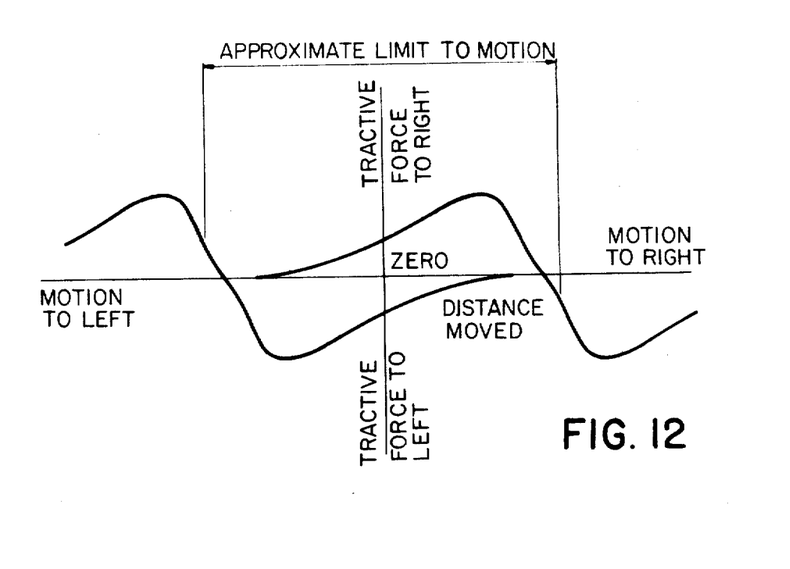
FIG. 12 shows the relationship between tractive forces and displacement from rest position.

FIG. 12 shows the relationship between tractive force and displacement from rest position for the type of vibratory motor described in this patent application, with the pole arrangement shown in FIG. 6. The upper curve shown in the figure shows the tractive force generated when the armature is to be driven to the right and the lower curve in the figure shows the tractive force generated when the armature is to be driven to the left. It can be seen that for motion on either side of the rest position the tractive force increases, rises to a maximum and then falls, reversing in sign. Passage of the armature through this point of force reversal retards further motion in this direction. It is this symmetrical action on either side of the rest position which provides the motor with its mose useful feature, that of inherent self limitation of amplitude of vibration, at a maximum safe stroke set by design, a feature not shared by other linear motors with a reciprocating flux action up till now.

For the vibratory conveyor shown in FIG. 4, using leaf springs as the resonant spring system, the vibrating linear motor is able to take advantage of the non-linearity of the spring system.

Figure 13:
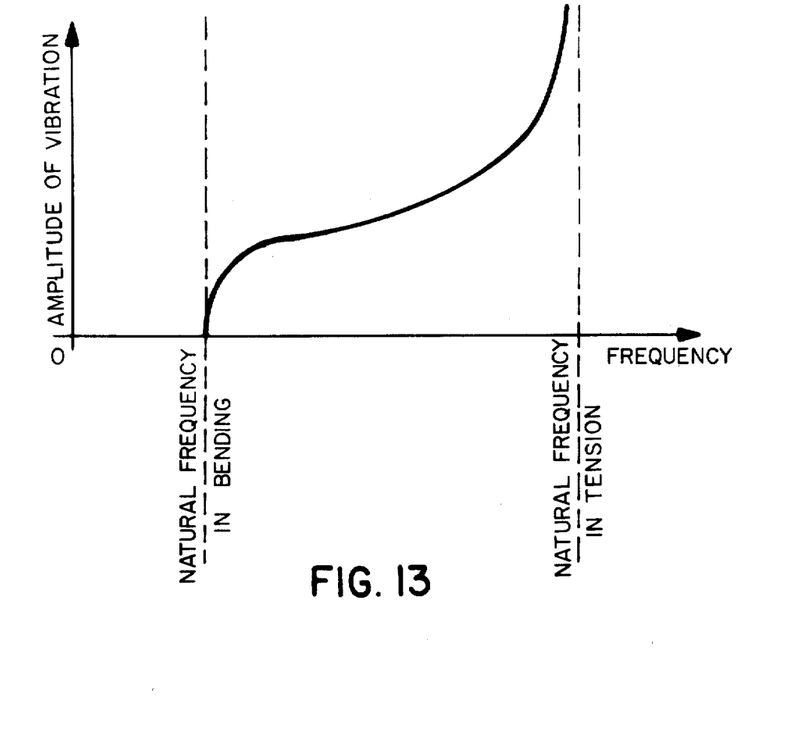
FIG. 13 is a graph showing the variation of resonant natural frequency with vibrational amplitude.

FIG. 13 plots the change in natural frequency of the vibrating leaf spring system shown in FIG. 5 as the amplitude of vibration increases. For small amplitudes of vibration the natural frequency is that of the leaf springs in bending but as the amplitude increases the natural frequency rises, approaching the natural frequency of the leaf springs in tension. The behaviour of the vibrating machine when operating with this non-linear resonant system is that, for any driving frequency between the two natural frequencies of the leaf spring system, the amplitude of vibration will remain stable at a value corresponding to the deflection where the natural frequency of the springs is combined bending and tension equals that particular driving frequency. By use of this phenomenon, stable oscillation may be obtained irrespective of loading.

Figure 14:
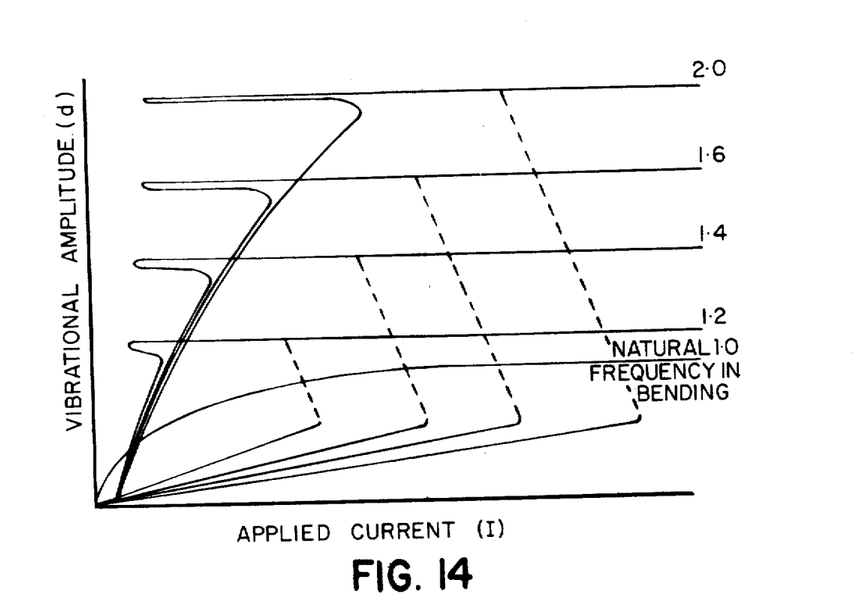
FIG. 14 is a graph showing a family of curves of vibrational amplitude plotted against the applied current for variation in drive frequency.

FIG. 14 shows the operation of the vibratory machine employing leaf springs in a non-linear manner where vibrational amplitudes (d) is plotted against alternating current applied to the electrical windings. If the machine is excited at the natural frequency of the spring system in bending the amplitude will initially rise rapidly with current, the rate of increase changing until the amplitude does not increase further with increase in current. For drive frequencies higher than the bending natural frequency, the amplitude will initially rise slowly with increasing current until a point is reached when the amplitude will jump to a larger stable value, this amplitude being that which causes the natural frequency to equal the driving frequency. This amplitude will remain stable for a large range of applied current. If the current reduces to a very low value the vibrational amplitude will suddenly decrease to a very small value, the motor behaving as though stalled.

Figure 15:
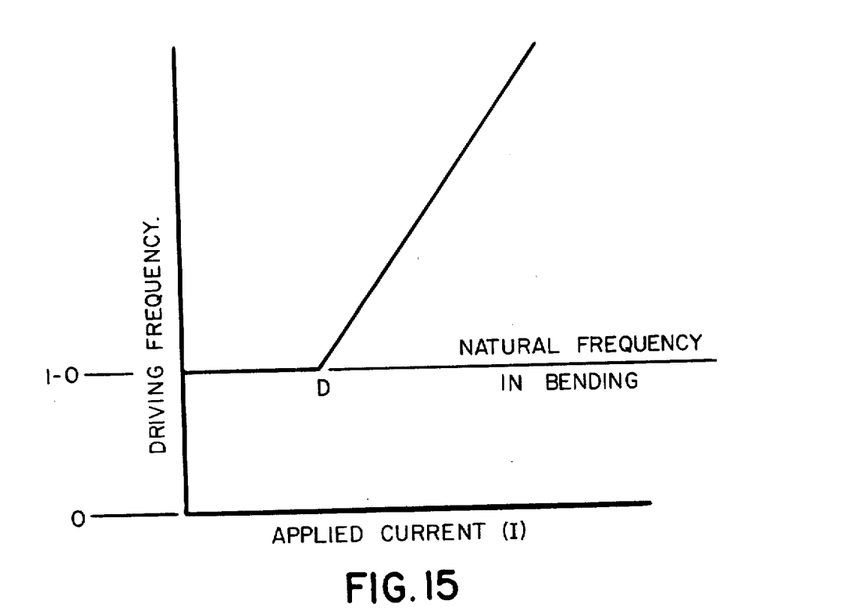
FIG. 15 is a graph showing a method of control used.

FIG. 15 shows a graph of the method of control that may be employed when the vibratory linear motor is applied to machines using leaf springs or other energy storage elements which display a non-linear characteristic with amplitude. The applied current at a frequency corresponding to the natural frequency of the system for small amplitudes is increased until a point (D) is reached and then both the applied current and the applied frequency are increased to provide increase in amplitude of vibration.

Figure 16:
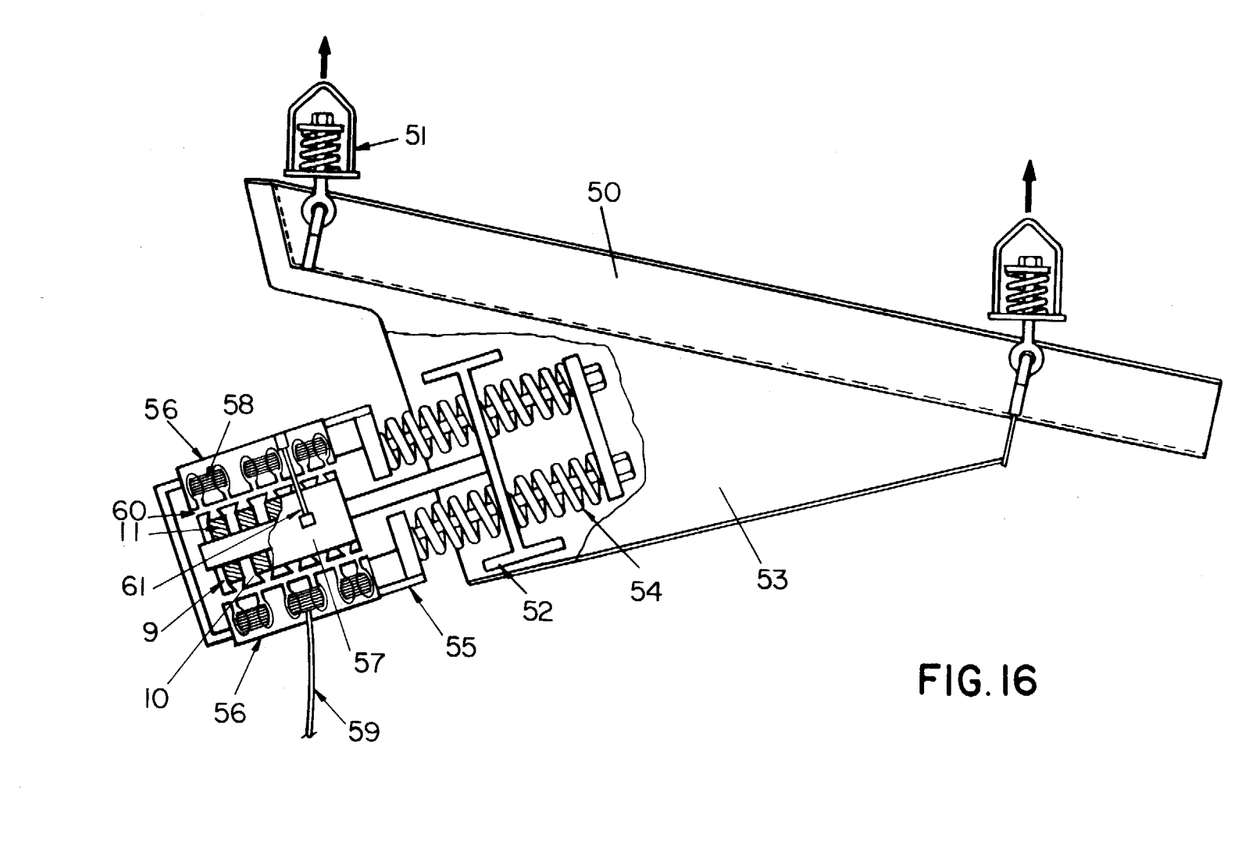
FIG. 16 shows the vibratory motor applied to a machine using coil springs as the resonant spring system.

FIG. 16 illustrates one method of applying the vibratory linear motor to a machine using coil springs as the resonant spring system. The basic principle of operation of the motor is the same as that shown in FIG. 5, but the arrangement is sufficiently different to warrant description. A vibrating trough 50 supported by isolating means 51 carries a beam 52 between wing plates 53 connected to the trough bottom. Coil springs 54 provide a resonant connection between driving mass 55 and the vibrating trough. Stator poles 56 are mounted above and below an armature 57 coupled to the beam 52. The armature is made up of permanently magnetized poles 9, 10, magnetization being generated by permanent magnets 11. Electrical windings 58 on the stator poles are provided with alternating current through electrical cable 59 from a suitable electrical source not shown. A small constant air gap 60 is provided between the faces of the armature poles and the stator poles, the gaps between the armature poles corresponding to the centres of the stator poles in the rest position as shown in FIG. 6. Stabilization means 61 are provided between the stator and armature to maintain the air gap 60 at a constant value while the machine is vibrating.

Figure 17:
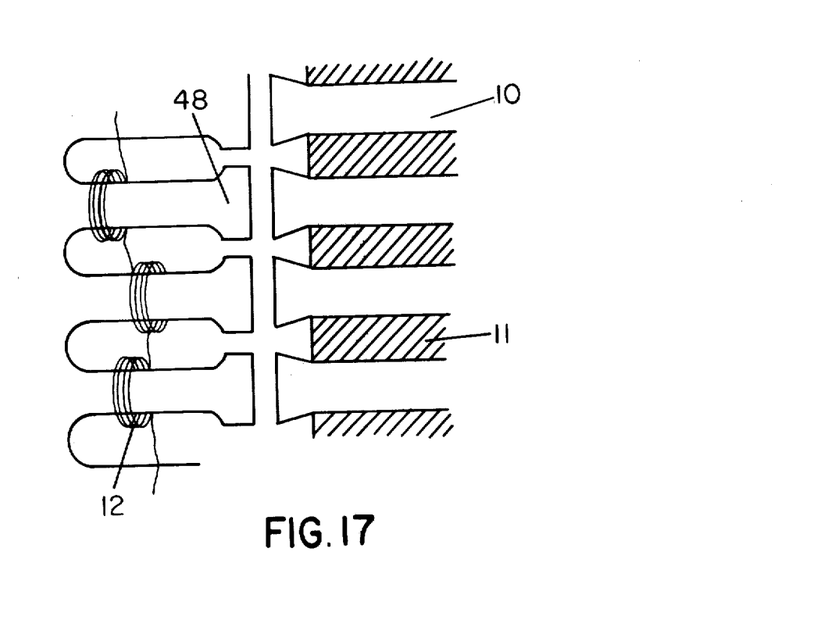
FIG. 17 is a detail showing the pole arrangement used for poles in opposition.

FIG. 17 shows an alternative arrangement for the vibratory motor where the armature poles 10 have the same pitch as the stator poles 48 but the gaps between poles are opposite each other, and the poles are in direct opposition in the rest position. This arrangement has no starting force but once in motion provides large driving forces. One method of starting such a vibratory motor would be a conventional electromagnet as is described in lines 10-17 of Page 2 but with a much larger air gap to eliminate the possibility of striking. This electromagnet could then provide initial vibration until the linear motor was able to continue of its own accord. The high current necessary for the electromagnet could be tolerated if this current were only used infrequently for starting purposes.

For the arrangement of poles in opposition the driving forces on the poles are quite different to the driving forces on the staggered pole arrangement shown in FIG. 6.

Figure 18:
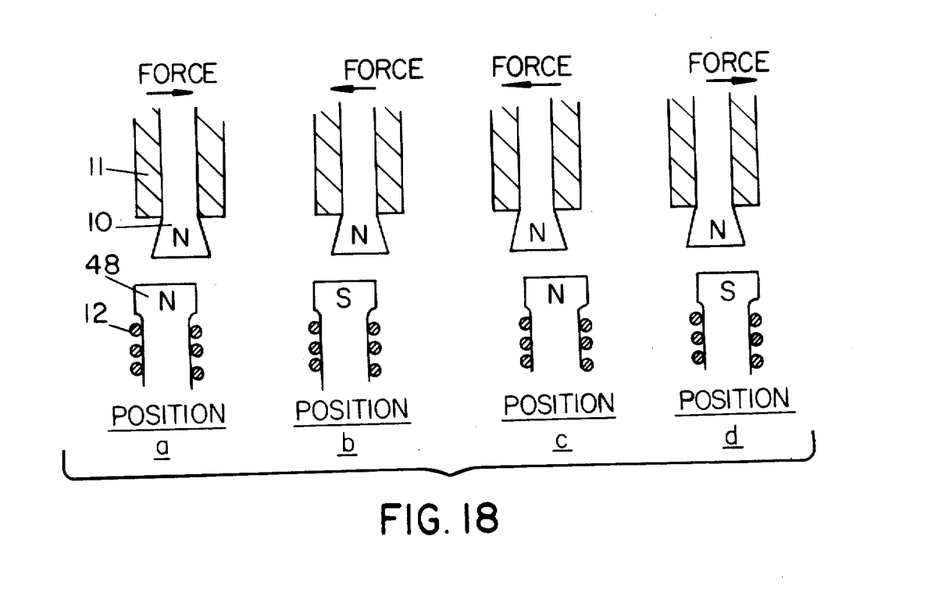
FIG. 18 shows the forces acting on a pole in opposition.

FIG. 18 illustrates this, where the motion of a moving pole 10, shown as having for this example a constant North polarity, is depicted. 48 is a magnetic pole which alternates in polarity, depending on the direction of current flow in the electrical winding 12. In the first position FIG. 18 (a), the two poles are of the same polarity and a repulsion force causes motion of the pole 10 to the right relative to the pole 48. When the current in the winding reverses, the two poles become of opposite polarity as shown in FIG. 18 (b) and are attracted to each other, causing relative movement of the pole 10 to the left. The current in the winding again reverses, causing repulsion as shown in FIG. 18 (c) and the movement continues to the left, passing through the position where the poles are exactly opposite each other. At the end of the motion to the left, the current reverses as shown in FIG. 18 (d), causing the poles to again be attracted to each other and the pole 10 returns to the right. The result is that the poles vibrate at exactly half the applied frequency and there is a highly efficient energy transfer as direct magnetic force is available for each part of the movement of the poles.

Figure 19:
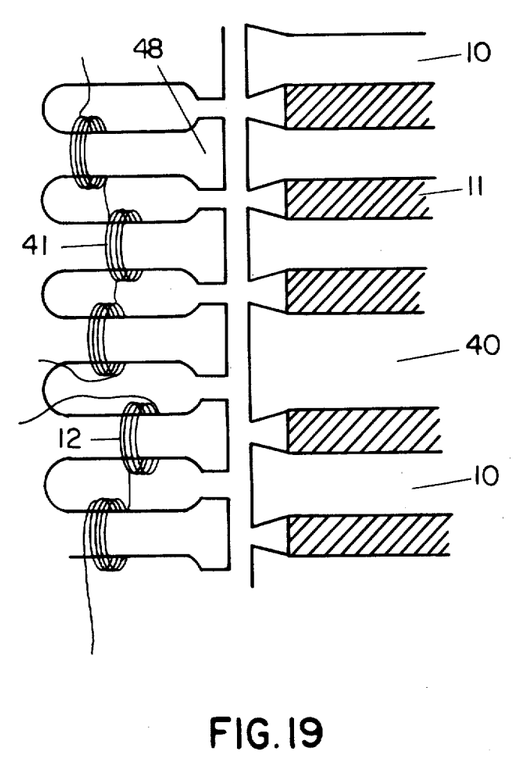
FIG. 19 shows a combination of staggered poles and poles in opposition.

Use of the two types of pole arrangement together gives the advantage of both high starting forces and driving forces remaining high close to the maximum amplitude of vibration. FIG. 19 illustrates the use of the two pole arrangements together. Armature poles 10 are energized by permanent magnets 11 and have the same pitch as the stator poles 48. Some of the armature pole 10 align with the stator poles as shown in the top of the figure, while other poles 10 have their centres aligning with the gaps between poles 48 as shown at the bottom of the figure. An armature pole 40 of different width is used to change from one pole arrangement to the other. Electrical windings 12 on the part of the stator having its pole gaps opposite the centres of the armature poles in the rest position are supplied with alternating current. Electrical windings 41 on the part of the stator where the centres of the stator poles align with the centres of the armature poles are supplied with alternating current of a frequency twice that supplied to electrical windings 12 and with a suitable phase between the two currents so that the driving forces generated by both currents are additive.

Figure 20:
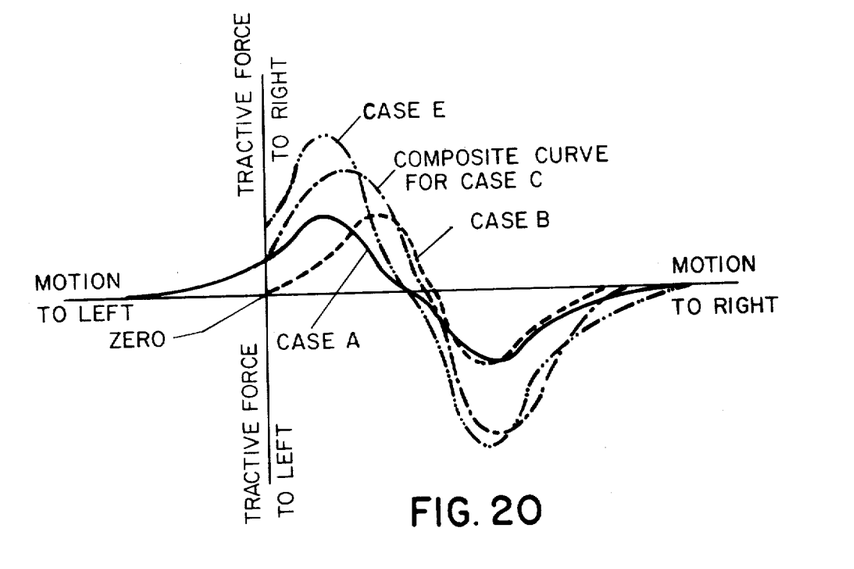
FIG. 20 shows tractive forces for various pole arrangements.

FIG. 20 shows several tractive force graphs for movement to the right. The figure would show forces symmetrical but of opposite sign for forces causing movement to the left but these are omitted for clarity. Case A shows the tractive force available from poles where the centres of the stator poles are opposite the gaps between armature poles, as shown in FIG. 6. Case B shows the tractive force available from poles where the centre of the stator pole is opposite the centre of the armature pole as shown in FIG. 17. It can be seen that the peak for Case B occurs further from the zero point for movement to the right. Case C represents a composite of Case A and Case B where the two forces have been added together, half the stator poles being opposite the armature poles and the other half of the stator poles having the pole centres opposite the armature pole gaps.

Case E illustrates where all the stator poles have their centres opposite the gaps on the armature poles. It can be seen that the maximum force for Case E is greater than the maximum force available for Case C but the maximum force for Case E occurs nearer to the zero point of motion.

Figure 21:
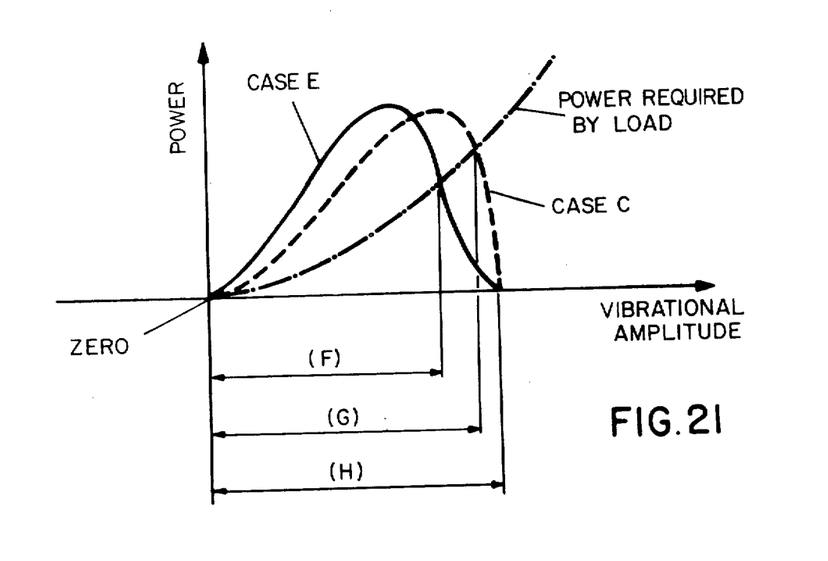
FIG. 21 shows the power that may be drawn from various pole arrangement.

FIG. 21 compares the power available from Case C and Case E plotted against vibrational amplitude. The power required by a load carried by a vibrational machine is zero for zero vibrational amplitude and increases as the vibrational amplitude increases, usually in a non-linear manner, increasing more rapidly as the amplitude increases. Case E, where all of the stator poles have their centres opposite the gaps of the armature poles, while having a higher maximum tractive force than Case C, has a power curve which is not as high as that for Case C, near the maximum possible vibrational amplitude. When the vibratory motor is driving the load the maximum amplitude that could be obtained from Case E is shown as F, whereas for Case C a much greater amplitude, G, could be obtained. The maximum amplitude H will be the same for either Case C or E when the machine is unloaded. The machine which has its maximum load amplitude closest to its maximum unloaded amplitude will be the most efficient in design and it is shown here that the vibratory motor having poles of two types, that is, poles in opposition and staggered poles, will be the most efficient.

FIG. 21 relating power to vibration amplitude is analogous to that of the torque speed curve for induction motors where motors having the smallest slip or reduction in speed from their full speed to their loaded speed are the most efficient in design.

The most important feature of the linear motor shown adapted to resonant vibratory machines is that the amplitude of vibration is inherently self limiting preventing damage to the machine when operated at resonance. Obviously those skilled in the art may make various changes in the details and arrangement of parts without departing from the spirit and scope of the invention as defined by the claims hereto appended and we therefore wish not to be restricted to the precise construction herein disclosed.

What I claim is:

1. An electromagnetic vibratory motor comprising:

an armature having a plurality of magnetic poles spaced apart along the direction of action of the motor, said poles having flat pole faces generally parallel to said direction of action forming a plane and having gaps therebetween which are smaller than the width of the pole faces;

a spring means attached to said armature;

a stator having a plurality of magnetic poles spaced apart along the direction of action of said motor, the shapes of both said armature and said stator poles being substantially identical, each being symmetrical about an axis drawn through its face normal to said direction of action of said motor, the pole pitch of said stator poles being the same as that of said armature poles, said armature and said stator poles being closely adjacent relative to the distance between the axis of symmetry of adjacent ones of said armature and said stator poles with said stator poles arranged symmetrically about the centres of respective ones of said armature poles in the rest position wherein the centres of gaps between adjacent ones of said stator poles are located opposite the centres of respective ones of said armature poles;

said armature and stator pole arrangement being such that the respective gaps on either side of the motor between the plane of the armature pole faces and the plane of the opposed stator pole faces remain of substantially constant width during translation of the armature;

means to energize said stator poles; and means to energize said armature poles.

2. An electromagnetic vibratory motor as defined in claim 1 wherein said means to energize said stator poles comprises a first electrical winding about said stator poles and said means to energize said armature poles comprises a second electrical winding about said armature poles wherein said first electrical winding is energized by an alternating current and said second electrical winding is energized by an alternating current of a frequency twice that of the alternating current energizing said first electrical winding.

3. An electromagnetic vibratory motor as defined in claim 1 wherein said means to energize said stator poles comprises a first electrical winding about said stator poles energized by direct current and said means to energize said armature poles comprises a second electrical winding about said armature poles energized by alternating current of a frequency approximately equal to the frequency of the resonant system formed by said armature mass and said spring means.

4. An electromagnetic vibratory motor as defined in claim 1 wherein said means to energize said stator poles comprises a first electrical winding about said stator poles energized by alternating current of a frequency approximately equal to the frequency of the resonant system formed by said armature mass and said spring means and said means to energize said armature poles comprises a second electrical winding about said armature poles energized by direct current.

5. An electromagnetic vibratory motor as defined in claim 1 wherein said means to energize said stator poles comprises a permanent magnetic means and said means to energize said armature poles comprises an electrical winding energized by alternating current of a frequency approximately equal to the frequency of the resonant system formed by said armature mass and said spring means.

6. An electromagnetic vibratory motor as defined in claim 1 wherein said means to energize said stator poles comprises an electrical winding about said stator poles energized by alternating current of a frequency approximately equal to the frequency of the resonant system formed by said armature mass and said spring means and said means to energize said armature poles comprises a permanent magnetic means.

* * * * *